United States Patent
Alston

(10) Patent No.: US 7,218,918 B1
(45) Date of Patent: May 15, 2007

(54) SYSTEMS AND METHODS FOR A WIRELESS MESSAGING INFORMATION SERVICE

(75) Inventor: Douglas Alston, Fayetteville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 418 days.

(21) Appl. No.: 10/195,346

(22) Filed: Jul. 15, 2002

(51) Int. Cl.
*H04M 1/725* (2006.01)

(52) U.S. Cl. .................... 455/412.1; 455/7; 455/226.1; 455/566

(58) Field of Classification Search .. 455/412.1–412.2, 455/456.3, 466, 461, 463, 435.1; 379/76, 379/279, 267
See application file for complete search history.

(56) References Cited

U.S. PATENT DOCUMENTS

| | | |
|---|---|---|
| 6,381,465 B1 | 4/2002 | Chern et al. |
| 6,751,484 B1 * | 6/2004 | Sandelius et al. ........... 455/566 |
| 6,839,556 B2 * | 1/2005 | Malackowski et al. .. 455/414.3 |
| 2002/0059148 A1 * | 5/2002 | Rosenhaft et al. ............ 705/77 |
| 2003/0176162 A1 * | 9/2003 | Planki et al. .............. 455/3.01 |

OTHER PUBLICATIONS

"Why Advertise on Mobile Devices," www.stoplookclickon.com, (Jul. 3, 2002) pp. 1-3, All info/pages © Daniel Lennox 2000/2001.
Christopher Saunders, "L90 Strikes SMS Ad Deal," www.internetnews.com, (Jan. 17, 2001), pp. 1-3 Copyright 2002 INT Media Group, Inc.

* cited by examiner

*Primary Examiner*—Gerald Gauthier
(74) *Attorney, Agent, or Firm*—Merchant & Gould, LLC

(57) ABSTRACT

A method and system for sending information in the form of a wireless message to a wireless device subscriber requesting advertising, product, or service information is described. The method includes assigning an information request code by a service provider to the information provided by an advertiser, presenting or displaying the information request code along with an advertisement to potential consumers, receiving the information request code from the wireless device, and sending a wireless message to the potential consumer's wireless communication device. The system includes an advertisement comprising an information request code, a wireless communication device operable for sending the information request code and receiving a wireless data message, a wireless communication center in communication with a wireless network and operable for relaying, storing, and forwarding the wireless data message to the wireless communication device.

12 Claims, 2 Drawing Sheets

SYSTEMS AND METHODS FOR A WIRELESS MESSAGING INFORMATION SERVICE

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of wireless communications. More particularly, this invention relates to methods and systems in which a wireless service provider may offer wireless data messages to mobile subscribers including detailed product, service, and promotional information.

2. Description of the Related Art

Effective advertising can dramatically increase revenue levels for all types of businesses. Advertisers utilize a variety of forms and mediums to convey their message, including written words on a billboard, spoken words transmitted over the radio, and commercials broadcast during pre-selected breaks in the broadcast of a television program. As the Internet has grown, so has advertisers utilization of this new medium. "Pop-up" and "pop-under" windows are well known to the average Internet user. Because of the popularity of such advertising, at least to the advertisers, many Internet service providers and search engine companies are able to offer free services to consumer, supporting these services solely or at least primarily with advertising dollars.

Advertising is typically most effective when information is presented in a clear and informative manner and targeted towards specific groups of potential consumers. Targeted advertising refers to a method in which an advertiser identifies a group of consumers as those likely to purchase an advertised product or service. For example, advertisers often gather demographic data related to audiences of specific television programming and tailor advertising campaigns around the demographics. Advertisers approach billboard advertising in a similar manner. For example, advertises often use billboards as a medium for advertising new automotive products, including the automobiles themselves. Because of the location of billboards along roadways, automobile advertisers know that automobile drivers are likely to see their advertisements. Since drivers often listen to the radio while driving, automobile advertisers are likely to use this medium as well.

One medium that advertisers have not yet begun to utilize is the personal wireless communication device. Since the introduction of personal wireless communication devices, such as cell phones, the way in which people communicate with one another and access information has changed dramatically. Using conventional devices, subscribers stay connected on the road, in the air, and virtually anywhere a wireless network reaches. Wireless communication devices provide a variety of services ranging from phone calls, access to the Internet, and two-way text messaging. Utilizing these devices and services, wireless subscribers are able to carry out their day-to-day business from their cars, the jobsite, and even from different countries.

Due to advances in wireless technology, increases in coverage areas, and decreases in the costs of wireless services, the popularity of wireless services continues to grow. Along with a larger wireless market comes competition among equipment and service providers for customers. This competition has lead to better devices and more services, such as smaller phones, better displays, clearer reception, and text messaging.

Advertisers are constantly attempting to identify new forms and new mediums for advertising. And service providers are constantly searching for new and better revenue streams. In addition, consumers are constantly striving to increase the ease of access and the quality of information that they get from various information sources. What is needed is a way to combine wireless service providers' need to increase revenues, advertisers' need to present products and services to potential consumers, and a consumers' need for easier access to more information. By combining these, all parties will benefit. Revenues increase for service providers and advertisers, and consumers are able to make easier and more informed purchasing decisions. What are needed are methods and systems that work to achieve all of the above goals.

BRIEF SUMMARY OF THE INVENTION

As wireless data and message services gain acceptance in the United States and other countries, it is desirable for wireless service providers to leverage wireless messaging technologies by selling services to advertisers and broadcasters looking to build stronger relationships with their current and potential consumers. It is further desirable for wireless service providers to increase their revenues by offering the services of the present invention along with their current messaging services. The methods and systems of the present invention provide an efficient mechanism for providing detailed product, service, and promotional information to consumers.

The methods and systems of the present invention benefit advertisers, wireless service providers, and current and potential customers. Advertisers benefit because they are provided with access to an efficient mechanism for supplying targeted information to consumers. The information is targeted because it is not sent out randomly or broadcast to all consumers, but sent only to those specifically requesting the information. Service providers benefit by realizing a revenue stream for providing the information transfer mechanism that puts advertisers in touch with consumers. Consumers benefit by having access to information that aids them in making informed purchasing decisions. The information requested by a consumer may be information relating to products, services, sales, promotions, and any additional information.

In one embodiment of the present invention, a service provider implements a system for providing product, service, and other information. The system includes a wireless communication center. The wireless communication center includes a database for storing a data element corresponding to an information request code and a processor for (1) receiving the information request code from a wireless communication device, (2) retrieving the data element, (3) generating a data message containing the data element, and (4) sending the data message to the wireless communication device that sent the original request. The communication center may include a messaging center, which is capable of sending e-mail to an e-mail account associated with the wireless communication device. The communication center may also include a web server or a link to a provider's web server so that a consumer's personalized web page can be modified based on information requests.

The wireless communication device in an embodiment of the present invention is capable of performing two-way communication. Examples of such a device include a digital cellular telephone, a personal digital assistant, a handheld computer, and a two-way pager. In order to enhance the usability of the wireless communication device, in one embodiment, the device allows the subscriber to enter an information request code using a numeric key pad and then use a single special purpose key to send the information request to the communication center. The special purpose key may be a programmable ("soft key") or a pre-programmed ("hard key") function key.

In an embodiment of the present invention, the message format corresponds to the capabilities of the wireless communication device that requested the information. For example, the format may be one of the following: a short message service (SMS) message, an enhanced message service (EMS) message, a multi-media message service (MMS) message, and a wireless access protocol (WAP) message.

The information request code may be a globally used code or a regional code, depending upon the needs of the service provider, the advertiser, and of the subscriber. The information request code is in the range of about 3 to about 10 alphanumeric characters in length, more preferably from about 3 to about 5 alphanumeric characters in length. The length of the code and the selectability of the code characters make it easier for a subscriber to remember the code, as compared to a conventional dialing number.

One embodiment of the present invention includes an administrative module for receiving the data element, assigning an information request code to the data element, and storing the code and data element in a database. Once the service provider stores the information request code and related data, the advertiser can provide the code to a current or potential consumer.

Embodiments of the present invention provide numerous advantages over conventional methods of providing product and service information. Service providers derive additional revenues by facilitating the service. Advertisers and information providers are able to direct product and service information directly to interested consumers. Consumers are able to access information related to products and services they are interested in, enabling the consumers to make educated purchasing decisions.

BRIEF DESCRIPTION OF THE DRAWINGS

These and other features, aspects, and advantages of the present invention are better understood when the following Detailed Description of the Invention is read with reference to the accompanying drawings, wherein.

DETAILED DESCRIPTION OF THE INVENTION

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. Conventional hardware and systems are shown in block diagram form and process steps are shown in flowcharts.

Figure 1:
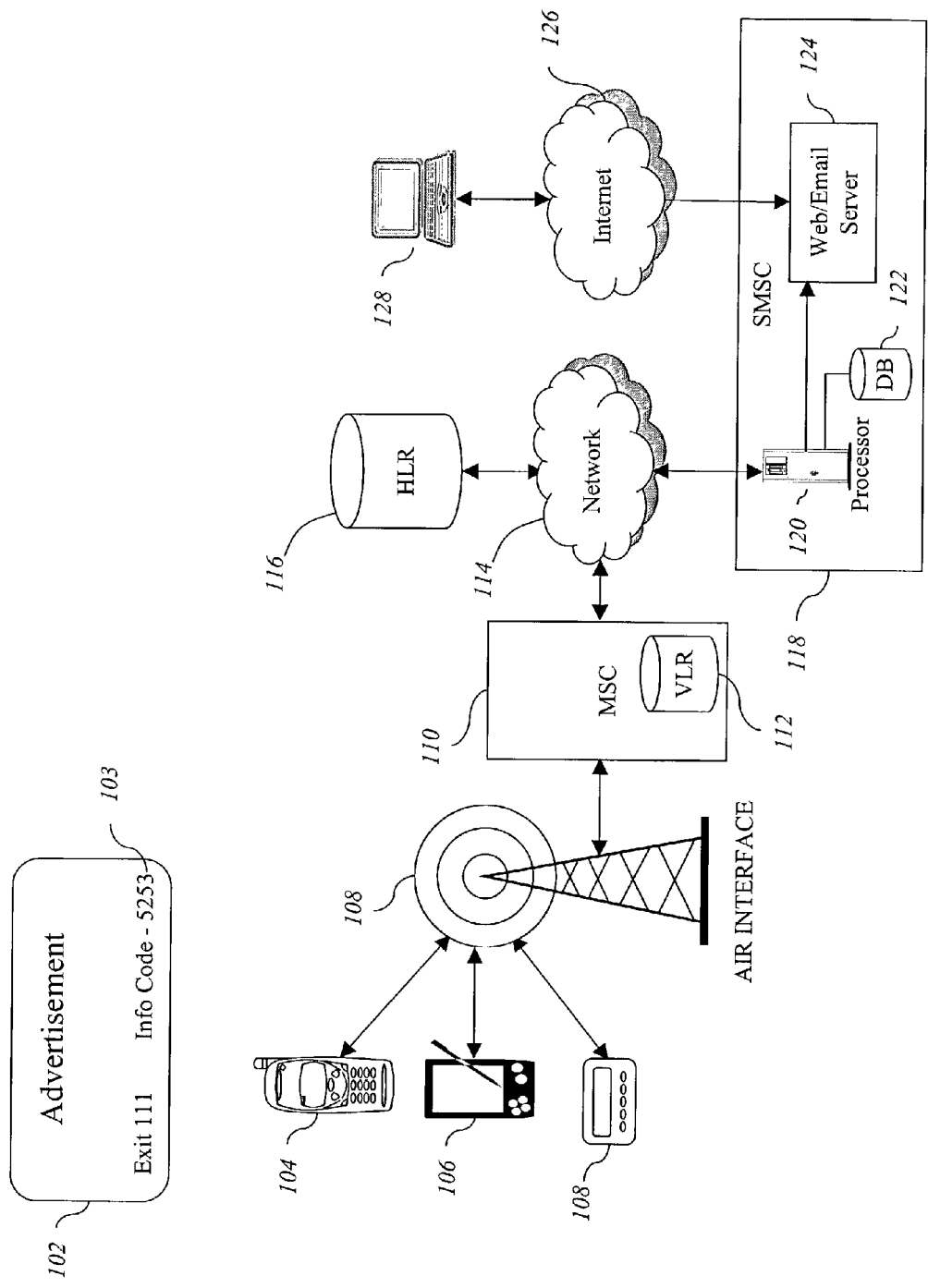
FIG. 1 is a block diagram illustrating a wireless communication system in accordance with an exemplary embodiment of the present invention.

FIG. 1 is a block diagram illustrating an exemplary environment for operation of an embodiment of the present invention. In the embodiment shown, an advertiser contracts to use a billboard 102. The advertiser also contracts with a telecommunications service provider to create an information request code 103, which can be displayed along with an advertisement on the billboard 102. When the advertiser contracts with the service provider, the advertiser provides data related to the product or service, which the service provider stores in a database (described below) along with the information request code 103. For example, an advertiser may give a product description to the provider to store with the information request code. An advertiser may instead give promotional material, such as a coupon, to the provider to store with the code.

As illustrated in FIG. 1, the present invention operates in a wireless communication network environment. While one environment is illustrated, it is to be understood that the present invention can be implemented in various configurations and architectures. In an embodiment of the present invention, a subscriber uses a wireless communication device that is capable of receiving and originating short data messages, such as in a short message service (SMS) system. In the embodiment shown in FIG. 1, the wireless communication device is a cell phone 104, a personal digital assistant 106, or a two-way pager 108. However, the wireless communication device is not limited to these three types of devices. Wireless communication devices are constantly and rapidly evolving.

The basic network architecture of the present invention is based on wireless networks, such as the global system for mobile communications (GSM), code division multiple access (CDMA), and time division multiple access (TDMA) standards. The GSM, CDMA, and TDMA standards specify how data signals are transmitted and received in a particular wireless communication network. In GSM networks for example, the type of messaging service is identified by the protocol identifier information element, which identifies the higher-level protocol or inter-networking being used. Wireless networks may include national and international coverage areas and may support more than one wireless technology.

In the embodiment shown, the wireless communication device, such as cell phone 104, is in communication with a wireless network via an air interface 108. The air interface 108 is connected to the mobile switching center (MSC) 110, which may also be referred to as a mobile telephone switching office (MTSO). The MSC 110 includes a visitor location register (VLR) 112. The VLR 112 maintains information about wireless communication devices currently within range of a base station (not shown) associated with the MSC 110. The MSC 110 also communicates with various other elements via various other networks, which are represented by network 114 in FIG. 1. The network may consist of a trunk established between the MSC 110 and another location, the public switched telephone network (PSTN), or other public, private, or governmental network.

In the embodiment shown, MSC 110 communicates with a home location register (HLR) 116. The HLR 116 consists of a database used for the storage and management of customer accounts, including service profiles and customer account histories. When the SMSC 118 queries the HLR 116, the HLR provides routing information for each particular subscriber.

The MSC 110 also communicates with a short message service center (SMSC) 118. The SMSC 118 includes a combination of hardware and software components, such as a messaging server or processor 120 in FIG. 1, for the relaying, storing, and forwarding of short messages to a wireless communication device 104. The SMSC 118 also includes a database 122. The database 122 stores the information request codes and associated data. The processor 120 receives requests for information that include the information request code, searches the database for information related to the code, constructs a data message including the data, and causes the SMSC 118 to send the message, in this example, a SMS message.

The SMSC 118 may perform additional functionality as well. In the embodiment shown in FIG. 1, the SMSC 118 is connected to an email/web server 125, which is connected to the Internet 126. The processor 120 in the SMSC 118 is capable of creating an email message containing the retrieved data and passing the email message toe the email server 125, which sends it to a user accessing a computer 128. Sending an email is an advantageous method for an advertiser to relay information to a potential consumer because the consumer can then later access the Web using their wireless communication device, personal computer or other web-enabled device and access the link, preventing the need for a consumer to remember the URL.

In an embodiment of the present invention, if a subscriber is available when a data message is to be delivered, the message is delivered. However, if a subscriber is unavailable at the time of an attempted delivery and then later becomes available, the HLR 116 may inform the SMSC 118 that the subscriber is now available, and the SMSC 118 then delivers the message.

Wireless messaging provides an efficient mechanism for transmitting short subscriber requests and provider responses in a wireless environment. One particularly advantageous aspect of many wireless-messaging technologies is that a data message may be delivered to a wireless device whether or not the wireless device is active at the time of attempted message delivery. Therefore, an active wireless communication device is able to receive or submit a data message at any time; independent of whether a voice or data call is in progress. The network guarantees delivery of the data message, and temporary message delivery failures due to an unavailable receiving device are stored in the SMSC 118 until the destination device becomes available. This is a very effective form of information delivery for an advertiser because it means that a potential consumer is always provided with the requested information, whether or not the device is in use.

Figure 2:
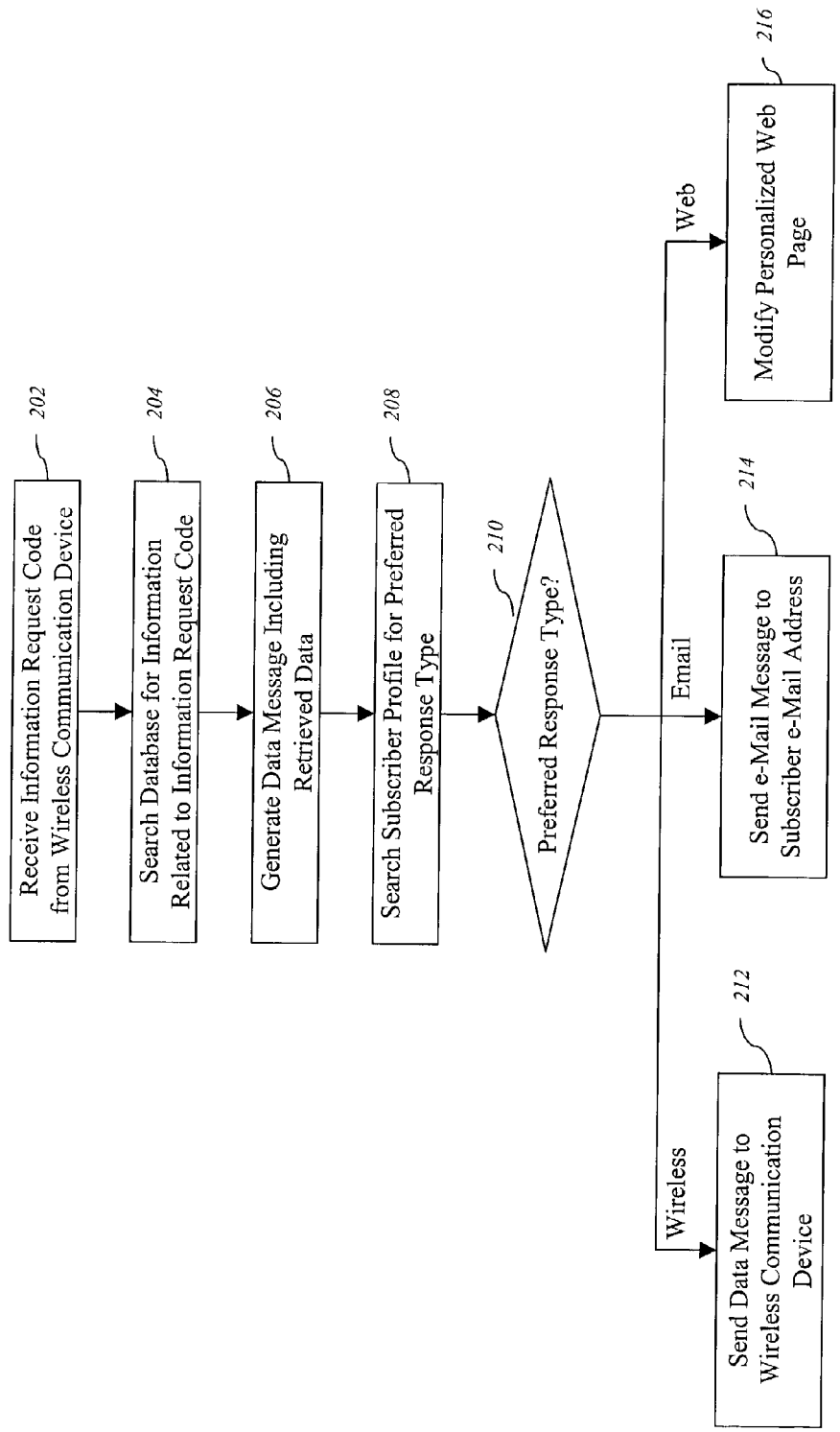
FIG. 2 is a flowchart illustrating a process of delivering a data message in response to an information request in accordance with an exemplary embodiment of the present invention.

FIG. 2 is a flowchart illustrating the process of providing wireless product or service information in an embodiment of the present invention. The SMSC (118) first receives a request from a wireless communication device (104) 202. The request includes an information request code (103), such as "5253." The processor (120) searches the database (122) for information related to the code 204. The processor (120) utilizes the information retrieved to generate a data message 206.

The processor (120) is now ready to send the message. In the embodiment shown in FIG. 2, the processor is capable of providing the information to the subscriber in a variety of ways based on information stored in the subscriber's service profile in the HLR database (116). or in the wireless center database (122). The process of sending wireless communication, email, and other electronic messages is well known.

In the embodiment shown in FIG. 2, the processor (122) searches the subscriber profile and retrieves the subscriber's preferred response type 208. The preferred response type in the embodiment shown may be wireless, email, or web. If the subscriber has no preference or has selected wireless, the processor (122) generates a wireless message, such as a short messaging service (SMS), enhanced messaging service (EMS), multi-media messaging service (MMS), or wireless application protocol (WAP) message 212. If the subscriber's response preference is for email, the processor (122) generates an email message and sends the message to the subscriber's email account. If the preference is for web responses, the processor (122) sends the message to the web server (125), which modifies the subscriber's personalized page on the provider's web site 216.

Embodiments of the present invention may include various other features. In one embodiment, if a message delivery attempt fails, the service provider stores the advertiser's message reattempts delivery until either delivery is successful and confirmed or until an expiration time is met. The expiration time is a date and time set by either the message service provider or the advertiser. A service provider may set an expiration date in order to make efficient use of limited storage capacity in the SMSC 118. The advertiser may set an expiration date because after that time, the information is outdated or in need of updating. Once messages expire, the service provider may send them via an alternative delivery system, such as an e-mail address listed in the customer's profile. In one embodiment, the service provider delivers requested advertiser messages in the order that they were requested. In another embodiment, the advertiser labels a subset of information as urgent. The service provider delivers the urgent information before information not labeled as urgent. The service provider also responds to requests for urgent information regardless before requests from non-urgent information, regardless of the order of receipt.

Embodiments of the present invention may utilize a variety of mechanisms for delivering product and service information. For example, the data may be sent as data or e-mail messages, or reflected as changes to a personalized web site as previously discussed and may also be sent as text messages, voice-messages, or as a fax. The wireless communication device used in an embodiment present invention may include a voice mail system or service, which is operable for receiving, storing, and playing voice messages sent by an advertiser via the SMSC 118 or other means. Voice information messages are messages intended for a potential consumer that was busy or not available to accept a voice call. When a voice message is left on a wireless subscriber, a voice message notification message is sent to their associated device. The device may also have text messaging capability.

In order for an advertiser to send a message to a potential consumer, the advertiser must first obtain an information request code from a service provider. As stated above, the information request code corresponds to information stored in the database 122 of the SMSC 118. The information request code consists of about 3 to about 10 alphanumeric characters, and more preferably, from about 3 to about 5 alphanumeric characters in length. An example of an information request code is "5253" as shown in FIG. 1. Once the advertiser reserves the code, the advertiser then includes the code in various forms of advertising, such as billboards, magazine advertisements, and the like.

A potential consumer seeing the advertisement and information request code then enters the code into their wireless communication device as a request for further information and presses a programmable ("soft key") or pre-programmed ("hard key") button on the device to submit the request. A data message is then sent to the potential consumer in the method and system described above. By using an information request code shorter in length than a typical dialing number, which is usually seven to ten characters in length, and a special purpose key to initiate the information request message, a potential consumer is more likely to remember the code.

In alternative embodiments, a subscriber may input requests into the wireless communication device using various techniques. These techniques may include dialing an information request telephone number, accessing a menu-based dual tone multiple frequency (DTMF) entry system, in which a subscriber dials into a provisioning system which guides the subscriber through a menu of provisioning options. The subscriber uses their wireless device to respond to the menu. Provisioning software captures the subscriber's responses and formulates these responses into an information request record, which may then be stored in a database, such as the database 122 in the SMSC 118. Additionally, the SMSC 118 may provide a variety of voice, automatic speech recognition (ASR), Fax, text-to-speech-based provisioning services using off-the-shell voice circuit boards from vendors such as Dialogic and Antares Audio Technologies. Such provisioning techniques may be implemented via hardware within the SMSC 118 and/or via software executing on an SMSC control computer in various embodiments.

Other access techniques available to subscribers with Internet access include the use of a web-based form, a formatted file, and a formatted e-mail message. When using a web-based form, a subscriber having a browser running on a computer with an Internet connection accesses a provisioning form by supplying a uniform resource locator (URL) for such a form. The subscriber may enter provisioning information (such as an information request code, subscriber name, subscriber address, subscriber phone number, and the date and time of the information request) into the form and send the form entries as a CGI string, in one embodiment, to a provisioning software interface.

Advertiser data messages may include sending a formatted e-mail or a formatted file from the SMSC 118 to a subscriber device. An exemplary formatted e-mail message may have a subject line of "REQUESTED INFORMATION", and contain labeled lines within the body of the e-mail. Such labeled lines may take the form of: "INFORMATION REQUEST CODE=5253", "DATE INFORMATION REQUESTED=040602", "TIME=043242", and the requested information, including Web addresses, product information, sales, etc. When a subscriber receives e-mail with a "REQUESTED INFORMATION" subject line and containing the above-labeled lines, the subscriber simply opens the e-mail and/or is directed to any links that may be provided. The e-mail may then be used to populate an information request record, which is then stored in a data store and/or database. The information request record may subsequently be used by an advertiser or wireless service provider to send future information messages, offers, sales, promotions, updates, etc.

Wireless messaging software is a component of an interface subsystem for an embodiment of the present invention and provides provisioning subscriber request input capabilities for advertisement information or product data. This application software is also responsible for generating records, which are stored in a data store, such as the SMSC database 122. As previously discussed, the application software may execute on an SMSC control computer and/or an application server in other embodiments, such as processor 120.

In one embodiment, each subscriber has a personalized home web page on a service provider's web site. All requested advertisement information is displayed on that web page by the web server 125 in response to messages sent by the processor 120 in the SMSC 118. For example, the web server 125 may establish a link to the homepage so that if a subscriber travels around town and requests information by inputting different information request codes associated with different advertisements, the SMSC 118 sends all requested information to the web server 125. At any later time, a subscriber may user a computer 128 or other access device to access the web page on the web server 125 and view all of the previously requested information. The information may include links to company websites to facilitate further information gathering by the subscriber.

The methods and systems of the present invention benefit advertisers, wireless messaging service providers, and potential customers. Advertisers benefit by being provided with an efficient mechanism for supplying their targeted information to requesting parties. Service providers benefit by supplying the information transfer mechanism that puts advertisers in touch with the potential consumers. Consumers benefit by receiving information that may aid them in making informed purchasing decisions.

That which is claimed:

1. A method for providing product and service information, comprising:

receiving an information request code via a short data message from a wireless communication device;

retrieving a data element from a database, wherein said data element is stored in association with said information request code;

generating a data message comprising said data element;

sending said data message to said wireless communication device;

determining a preferred response type associated with a subscriber wherein said data message is sent to said wireless communication device in response to determining that said preferred response type is wireless; and in response to determining that said preferred response type is email, sending an e-mail message to an email account associated with said wireless communication device, wherein said email message comprises said data element.

2. The method of claim 1, further comprising before the step of receiving an information request code:

receiving said data element;

assigning said information request code to said data element; and storing said information request code and said data element in said database.

3. The method of claim 1, further comprising before the step of receiving an information request code:

providing the information request code to a potential consumer.

4. The method of claim 1, further comprising in response to determining that said preferred response type is web, displaying said data element on a web page.

5. The method of claim 1, wherein said data message comprises a message selected from the group consisting of a short message service (SMS) message, an enhanced message service (EMS) message, a multi-media message service (MMS) message, and a wireless access protocol (WAP) message.

6. The method of claim 1, wherein said information request code comprises between 3 and 5 alphanumeric characters.

7. The method of claim 1, wherein said information request code comprises between 3 and 10 alphanumeric characters.

8. The method of claim 1, wherein said wireless communication device comprises a device selected from the group consisting of a digital cellular telephone, a personal digital assistant, a handheld computer, and a two-way pager.

9. The method of claim 1, wherein the information request code is operable in a pre-determined geographic area.

10. The method of claim 1, wherein when said wireless communication device is unavailable to receive said data message, further comprising receiving an indicator that said wireless communication device is available to receive said data message when said wireless communication device becomes available.

11. A computer program product comprising a computer-readable medium having control logic stored therein for causing a computing apparatus to provide product and service information, said control logic comprising computer-readable program code for causing said computing apparatus to:

receive an information request code from a wireless communication device as a short data message;

retrieve a data element from a database, wherein said data element is stored in association with said information request code received;

generate a data message comprising said data element;

retrieve a preferred response type associated with said wireless communication device;

in response to retrieving said preferred response type as wireless, sending said data message to said wireless communication device;

in response to retrieving said preferred response type as email, sending an e-mail message to an email account associated with said wireless communication device, wherein said email message comprises said data element; and in response to retrieving said preferred response type as web, sending said data element to a web page;

wherein sending said data message comprises sending said data element as at least one of the following:

a text message;

a voice message; and a fax.

12. A method for providing product and service information, comprising:

receiving an information request code via a short data message from a wireless communication device;

retrieving a data element from a database, wherein said data element is stored in association with said information request code;

generating a data message comprising said data element;

sending said data message to said wireless communication device;

determining a preferred response type associated with a subscriber wherein said data message is sent to said wireless communication device in response to determining that said preferred response type is wireless;

in response to determining that said preferred response type is email, sending an e-mail message to an email account associated with said wireless communication device, wherein said email message comprises said data element; and in response to determining that said preferred response type is web, displaying said data element on a web page.

\* \* \* \* \*